United States Patent
Shiell et al.

(10) Patent No.: US 10,567,427 B2
(45) Date of Patent: Feb. 18, 2020

(54) UNOBTRUSIVE AND DYNAMIC DDOS MITIGATION

(71) Applicant: Verizon Digital Media Services Inc., Playa Vista, CA (US)

(72) Inventors: Derek Shiell, Los Angeles, CA (US); Amir Reza Khakpour, Santa Monica, CA (US); Robert J. Peters, Santa Monica, CA (US); David Andrews, Los Angeles, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 0 days.

(21) Appl. No.: 15/954,709

(22) Filed: Apr. 17, 2018

(65) Prior Publication Data

US 2018/0241771 A1    Aug. 23, 2018

Related U.S. Application Data

(63) Continuation of application No. 14/714,449, filed on May 18, 2015, now Pat. No. 9,954,891.

(51) Int. Cl.
*H04L 29/06* (2006.01)

(52) U.S. Cl.
CPC ...... *H04L 63/1458* (2013.01); *H04L 63/1441* (2013.01); *H04L 2463/144* (2013.01)

(58) Field of Classification Search
None
See application file for complete search history.

(56) References Cited

U.S. PATENT DOCUMENTS

| | | | |
|---|---|---|---|
| 7,143,163 B1 | 11/2006 | Bleichenbacher et al. | |
| 7,197,639 B1 | 3/2007 | Juels et al. | |
| 8,171,562 B2 | 5/2012 | Feng | |
| 9,807,092 B1 * | 10/2017 | Gutzmann | H04L 63/1458 |
| 2003/0126514 A1 | 7/2003 | Shabbir Alam et al. | |

(Continued)

OTHER PUBLICATIONS

XiaoFeng Wang and Michael K. Reiter. 2003. Defending Against Denial-of-Service Attacks with Puzzle Auctions. In Proceedings of the 2003 IEEE Symposium on Security and Privacy (SP '03). IEEE Computer Society, Washington, DC, USA.

(Continued)

*Primary Examiner* — Jeffery L Williams
(74) *Attorney, Agent, or Firm* — Ansari Katiraei LLP; Arman Katiraei; Sadiq Ansari

(57) ABSTRACT

Some embodiments provide techniques for mitigating against layer 7 distributed denial of service attacks. Some embodiments submit a computational intensive problem, also referred to as a bot detection problem, in response to a user request. Bots that lack sophistication needed to render websites or are configured to not respond to the server response will be unable to provide a solution to the problem and their requests will therefore be denied. If the requesting user is a bot and has the sophisticated to correctly solve the problem, the server will monitor the user request rate. For subsequent requests from that same user, the server can increase the difficulty of the problem when the request rate exceeds different thresholds. In so doing, the problem consumes greater resources of the user, slowing the rate at which the user can submit subsequent requests, and thereby preventing the user from overwhelming the server.

20 Claims, 6 Drawing Sheets

(56) References Cited

U.S. PATENT DOCUMENTS

| | | | |
|---|---|---|---|
| 2004/0093371 A1 | 5/2004 | Burrows et al. | |
| 2004/0143670 A1 | 7/2004 | Roychowdhury et al. | |
| 2005/0195840 A1* | 9/2005 | Krapp | H04L 43/0894 370/401 |
| 2005/0216954 A1 | 9/2005 | Ramaiah et al. | |
| 2009/0013404 A1* | 1/2009 | Chow | H04L 63/1458 726/22 |
| 2011/0231913 A1 | 9/2011 | Feng et al. | |
| 2013/0163417 A1* | 6/2013 | Gupta | H04L 63/1458 370/230 |
| 2013/0212679 A1* | 8/2013 | Ansari | H04L 63/1416 726/22 |
| 2014/0282891 A1 | 9/2014 | Frechette | |
| 2015/0263987 A1* | 9/2015 | Klein | H04L 29/08 709/226 |
| 2018/0034710 A1* | 2/2018 | Allen | H04L 41/0896 |

OTHER PUBLICATIONS

Martin Abadi, Mike Burrows, Mark Manasse, and Ted Wobber. 2005. Moderately hard, memory-bound functions. ACM Trans. Internet Techno! 5, 2 (May 2005),299-327. DOI=http://dx.doi.org/10.1145/1 064340.1064341.

Juels, Ari; Brainard, John (1999). "Client Puzzles: A Cryptographic Countermeasure Against Connection Depletion Attacks" In Kent, S. Proceedings of NDSS '99 (Networks and Distributed Security Systems). pp. 151-165.

* cited by examiner

310: Nibble_val = get_user_var('ddos-shield-challenge-nibs') or '4';

320: Exp_val = now + (get_user_var('ddos-shield-cookie-duration') or '360');

330: User_agent = get_request_header('user-agent') or 'NA';

340: User_IP = get_user_IP;

350: Hash_token = hex(sha256(salt, User_IP, User_agent, Exp_val, Nibble_val));

360: String = Hash_token + '-' + User_Ip + '-' + Exp_val + '-' + Nibble_val

370: setContent(generateResponse(URL, Hash_token, Exp_val, Nibble_val))

FIG. 3

```
FUNCTION main(URL, String, Exp_val, Nibble_val)
   410: Sol_var = '11111111111111111111111111111111';
   420: Rand_num = 0;

430: while (false == verify(Sol_var, Nibble_val))
   {
      440: Sol_var = SHA256(String+'-'+Rand_num);
      Rand_num++;
   }

450: setCookie("cookie", String + '-' + (Rand_num-1), Exp_val);
   window.location = URL;
END 460:
FUNCTION verify(Sol_var, Nibble_val)
   return true if Sol_var string ends with Nibble_val zeros else return false
END
```

FIG. 4

510: IF cookie exists THEN
{

520: (Hash_token, cUser_IP, cExp_val, cNibble_val, cRand_num) = parse_cookie(String + '-' + (Rand_num-1))

IF Hash_token, cUser_IP, cExp_val, cNibble_val, cRand_num do NOT exist OR are incorrectly formatted THEN return ERROR

530: IF User_IP != cUser_IP THEN return response_code;

540: h = hex(sha256(salt, cUser_IP, User_agent, cExp_val, Nibble_val))
    IF h != Hash_token THEN return ERROR;

550: IF getCurrentTime() > Exp_val THEN setContent(generatedResponse(URL, newString, newExp_val, Nibble_val) );

560: IF ( NOT checkLastBytes( (hex(sha256(String + '-' Rand_num), Nibble_val) ) )

THEN return ERROR

ELSE PROCESS_REQUEST

UNOBTRUSIVE AND DYNAMIC DDOS MITIGATION

CLAIM OF BENEFIT TO RELATED APPLICATIONS

This application is a continuation of U.S. nonprovisional patent application Ser. No. 14/714,449 entitled "Unobtrusive and Dynamic DDoS Mitigation", filed May 18, 2015. The contents of application Ser. No. 14/714,449 are hereby incorporated by reference.

BACKGROUND INFORMATION

Distributed Denial-of-Service (DDoS) attacks attempt to bring down or otherwise degrade performance of one or more network accessible machines (i.e., servers). DDoS attacks involve a set of machines, also known as bots, launching a distributed attack against a specific machine or a set of machines providing some content or service. The basic premise of any DDoS attack is to flood a target server with so many messages or requests (e.g., content requests, connection establishment request, etc.) that the target server's resources become overwhelmed, leading to the target server being unable to respond to valid messages or requests it receives from valid users.

DDoS attacks can be performed at different layers of the Open Systems Interconnection (OSI) model. An application layer or layer 7 DDoS attack involves rapidly issuing content or service requests to the server with the intent of overwhelming the server resources.

Such layer 7 attacks are difficult to stop because the bots attempt to blend in with valid user requests and because of the distributed nature of the attack. Simply blocking one of the bots does not stop the other bots from issuing requests. Also, the target server experiences a relatively large resource impact for each bot attack that is successful. In response to each successful bot attack, the target server establishes and maintains a connection to that bot and further consumes resources in sending the requested content or services to the bot.

DDoS mitigation involves the ability to distinguish actual user requests from requests issued by bots. Since bots are typically created for the sole purpose of connecting to the target server and requesting content or services from the target server, one manner of distinguishing bots from actual users is to require the party requesting content or service from the target server to perform some task in order to validate itself as a valid user prior to the target server responding with the requested content or service.

CAPTCHA based techniques are one way to distinguish between valid users and bots. CAPTCHA techniques require some intelligence on the part of the requesting party to formulate a response to an image before the party is granted access to the requested content or service. However, CAPTCHA based techniques suffer from several shortcomings. First, CAPTCHA is invasive. CAPTCHA interrupts the requesting party's desired action and forces the requesting party to perform some action before the requesting party is permitted to continue with the desired action. Such interruption significantly degrades the end user experience and introduces significant delay. Second, since CAPTCHA is essentially a methodology based on optical character recognition, sophisticated bots can be programmed to identify and provide the correct answer in order to continue the DDoS attack. A bot having the necessary sophistication to thwart CAPTCHA at one target site can likely do the same at all other sites relying on CAPTCHA based techniques. As a result, CAPTCHA is, at best, a stop-gap technique for preventing DDoS attacks with the knowledge that one day such techniques can become entirely ineffective.

Accordingly, there is a need for improved techniques for DDoS mitigation. Specifically, there is a need for mitigation techniques that are not intrusive for the valid user, do not introduce noticeable delay to the overall user experience, and accurately distinguish bots from valid users. There is further a need for the mitigation techniques to be dynamic and responsive in face of increasing bot sophistication.

BRIEF DESCRIPTION OF THE DRAWINGS

A preferred embodiment of methods and systems for unobtrusive and dynamic DDoS mitigation will now be described, by way of example only, with reference to the accompanying drawings in which:

FIG. 3 provides pseudocode for generating the bot detection problem in accordance with some embodiments.

FIG. 4 provides pseudocode for an exemplary script from which a third party requestor solves a bot detection problem in accordance with some embodiments.

FIG. 5 presents pseudocode performed by the attack mitigation machine to verify the bot detection problem provided by a third party requestor.

DETAILED DESCRIPTION OF PREFERRED EMBODIMENTS

The embodiments set forth herein provide methods and systems for unobtrusive and dynamic Distributed Denial-of-Service (DDoS) attack mitigation. The methods and systems mitigate against application layer or layer 7 DDoS attacks in which attackers or bots attempt to render content or services of a targeted entity unavailable or unresponsive by sending an overwhelming number of content or service requests to one or more machines of the targeted entity.

Figure 1:
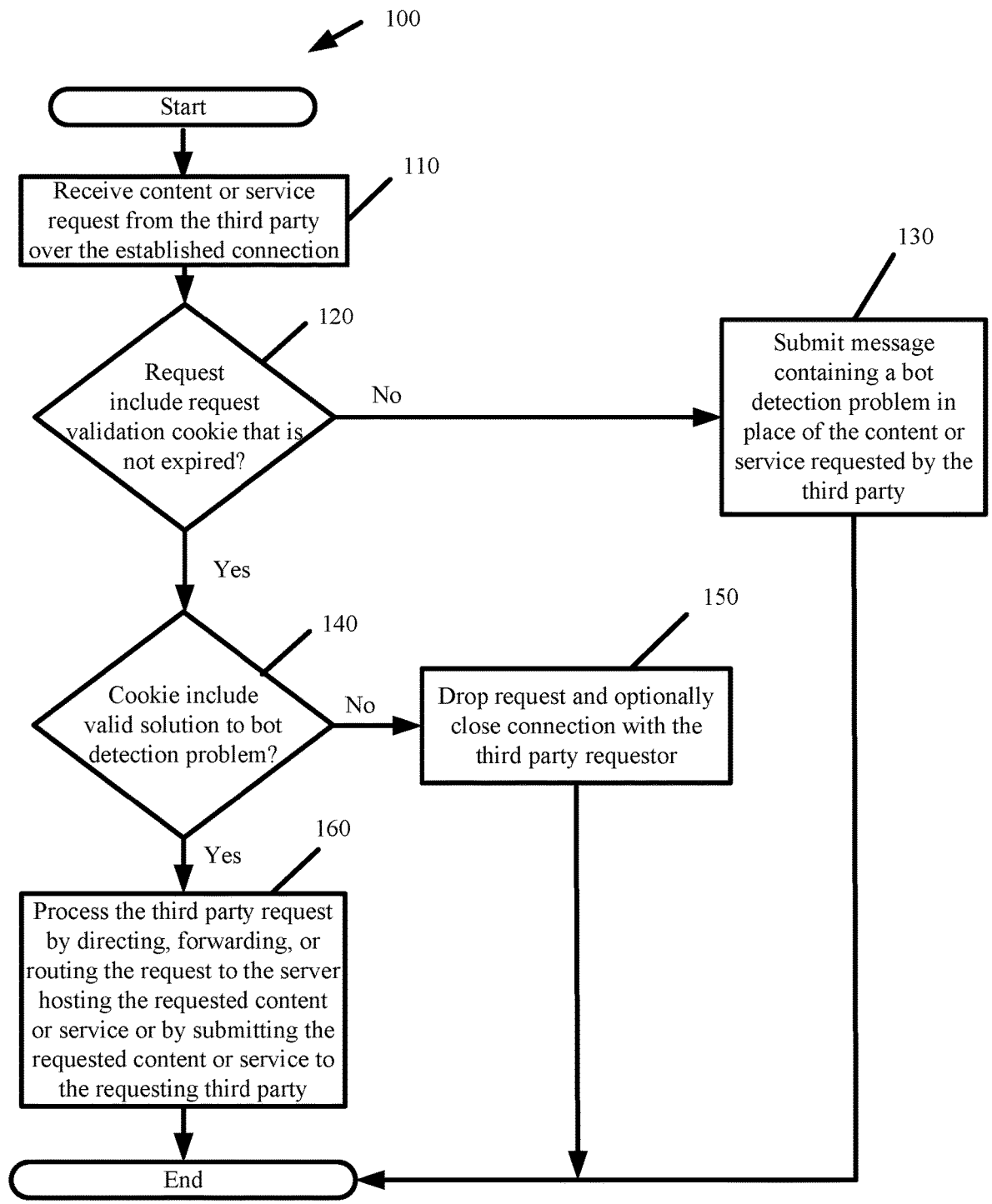
FIG. 1 presents an overview process for the DDoS attack mitigation methods and systems of some embodiments.

FIG. 1 presents an overview process 100 for the DDoS attack mitigation methods and systems of some embodiments. The process 100 is implemented by any machine operating under control of the targeted entity. Some such machines can include servers of the targeted entity that directly respond to client requests by serving the requested content or services. Other such machines include load balancers or front-end servers/processes of the targeted entity that direct, forward, or route the client requests within the targeted entity infrastructure to the one or more servers that host the requested content and services. In some embodiments, the machine implemented process 100 is performed by an entity protecting the targeted entity from such attacks. In any case, the machine implementing process 100 is referred to hereinafter as the attack mitigation machine.

The process commences by receiving (at 110) a third party content or service request over a newly established or previously connection between the third party and the attack mitigation machine of some embodiments. Typically, the connection is established using Transmission Control Protocol (TCP) and the request is a HyperText Transfer Protocol (HTTP) GET message, wherein the GET message identifies a Uniform Resource Locator (URL) for the content or service that is requested along with addressing identifying the third party. The third party address is typically provided as an Internet Protocol (IP) address. Process 100 can be adapted and applied to other messaging and protocols beside those enumerated above for exemplary purposes.

Upon receiving the content or service request, the process attempts to verify the third party requestor as an actual user and whether the third party's submitted request should be treated as an attack or not. Verification first involves determining (at 120) whether the received request includes a specific request validation cookie or header field(s) containing solution information to a bot detection problem.

When no solution information is provided with the request or the cookie or header that should contain the solution information is omitted or expired, the process responds to the third party request by submitting (at 130) a reply message containing a bot detection problem in place of the content or service requested by the third party. In some embodiments, the reply message containing the bot detection problem is a URL redirect. Upon sending the URL redirect containing the bot detection problem, the process may close the connection that is established with the third party requestor. In order to identify itself as a valid actual user, the third party requestor must solve the bot detection problem, reestablish a connection with the attack mitigation machine, and resubmit the original content or service request with a cookie containing the bot detection problem solution. In some embodiments, the bot detection problem solution can be conveyed using a structure or container other than the cookie header. In some embodiments, when the third party requestor sends two or more requests without the cookie present, each subsequent request after the initial request from the same third party is simply dropped without sending a reply with a bot detection problem. In some other embodiments, the process sends a reply with a bot detection problem to each and every request from a third party that does not include the cookie regardless of how many times that third party requestor resubmits the request.

When the request validation cookie with the solution information is provided with the request and the cookie is not expired, the process next determines (at 140) if the solution information provides a valid solution to the bot detection problem. When a cookie is provided with the request, but the solution information therein is invalid, the process drops (at 150) the request and, optionally, closes the connection established with the third party requestor. Further requests from the same third party can also be blocked for some period of time. When a valid cookie with solution information that is a correct solution to the bot detection problem is provided, the process processes (at 160) the third party request by directing, forwarding, or routing the request to the server hosting the requested content or service or by submitting the requested content or service to the requesting third party.

In some embodiments, the reply message with the bot detection problem is a message that is easily generated without much computational effort on the part of the attack mitigation machine. This allows the attack mitigation machine to receive and respond to a large number of requests that may or may not be part of a DDoS attack without unnecessarily tying up resources in providing the requested content or service in response to each request. Rather, the attack mitigation machine responds with the simple stateless single message containing the bot detection problem.

In some embodiments, the bot detection problem is a script that requires a scripting engine to execute in order to produce the solution that verifies the third party as an actual user and not an attacker. The required scripting engine can be the JavaScript engine or any other widely available scripting engine. The bot detection problem involves a sequence of computations or hashes in order to arrive at the solution. The computations obfuscate the bot detection problem solution, preventing an attacker's ability to arrive at the solution without engaging in the computational effort needed to generate the solution. Moreover, the bot detection problem and solution are customized for each third party requestor further obfuscating the ability of any sharing or reuse of the bot detection problem solution. As noted above, the bot detection problem can be generated and customized for each third party requestor without much computational effort by the attack mitigation machine. Another advantage of the bot detection problem is that the solution is known or easily verified by the attack mitigation machine, even though computation of the solution can be resource intensive with the difficulty of the solution being easily set by the attack mitigation machine when generating the problem. The bot detection problem generation is described in further detail with respect to FIG. 3.

At the most basic level, the bot detection problem differentiates requests originating from attackers and requests originating from actual users by requiring execution of the script using the scripting engine. Typically, bots that perpetrate a DDoS attack are themselves basic scripts that do nothing more than establish a connection with a server and then request some content or service from the server. Such bots either do not care about the server's response, do not know what to do with the server's response, or do not have the necessary features set (i.e., the scripting engine) in order to compute the bot detection problem solution. Accordingly, when the bot detection problem is submitted in response to the third party request, such bots will be unable to execute the problem, generate the correct solution, and/or return the response to the sender.

Actual users are unaffected by the bot detection problem because their requests typically originate from web browser applications or other applications or devices that run the scripting engine(s) necessary for rendering web content and for processing the bot detection problem. It should further be noted that the bot detection problem is unobtrusive to the human user. The web browser application running on the user machine receives the bot detection problem, executes the corresponding script, generates the solution to the problem, and then sends the solution to the attack mitigation machine in order to receive the content or service that was originally requested. These steps occur without any human involvement or interaction.

Processing the bot detection problem does introduce delay on the client side or third party requestor side. The delay results from the third party requestor performing the bot detection problem computations and from the added exchange in which the third party requestor receives the bot detection problem in place of the requested content, computes and sends a solution to the bot detection problem, and then receives the requested content or service upon correctly solving the bot detection problem.

The delay introduced by the added message exchange is insignificant and negligible. The delay introduced as a result of the bot detection problem is however, instrumental in the dynamic operation of the DDoS mitigation embodiments set forth herein. This delay is the means with which the attack mitigation machine mitigates attacks from more sophisticated bots having the ability to solve the bot detection problem. The attack mitigation machine increases the computational delay by increasing the number of computations, and thereby the difficulty of solving the bot detection problem that is provided to those third party requestors that submit abnormal numbers of requests to the attack mitigation machine. This increase can occur with each subsequent request or connection that the attack mitigation machine establishes with a specific third party requestor over a specific interval. By dynamically increasing this delay, the attack mitigation machine is able to reduce the rate at which any attacker can submit requests to the attack mitigation machine. Invalid requests submitted by attackers that do not solve the bot detection problem or provide the necessary cookie can be blocked or dropped without any processing.

Figure 2:
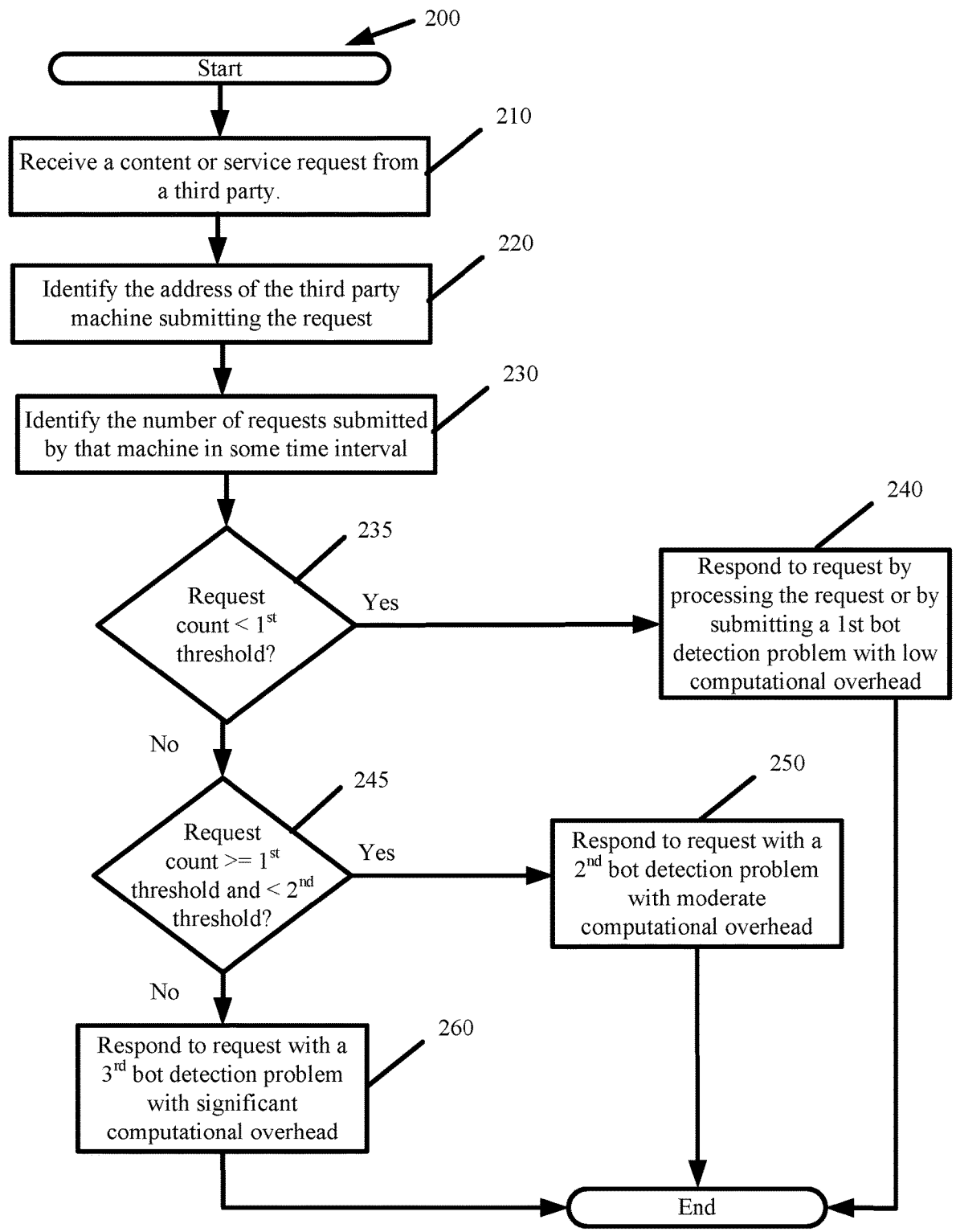
FIG. 2 presents a process for mitigating DDoS attacks by dynamically increasing the computational overhead of the bot detection problem in accordance with some embodiments.

FIG. 2 presents a process 200 for mitigating DDoS attacks by dynamically increasing the computational overhead of the bot detection problem in accordance with some embodiments. As with process 100, process 200 is implemented by the attack mitigation machine of some embodiments.

The process 200 commences by the attack mitigation machine receiving (at 210) a content or service request from a third party. The process identifies (at 220) the address of the third party machine submitting the request. Next, the process performs a lookup to identify (at 230) the number of requests submitted by that machine in some time interval. Actual users typically do not submit more than a couple of requests every few seconds, whereas bots attempting to take down a site will submit hundreds of requests every few seconds.

When the number of requests by the third party does not exceed (at 235) a first threshold, the process responds (at 240) to the third party request by processing the request or by submitting a first bot detection problem that involves a first relatively low amount of computational overhead. For example, the first bot detection problem may take an average machine twenty milliseconds to complete.

When the number of requests by the third party meets or exceeds (at 245) the first threshold and is less than a second threshold, the process responds (at 250) to the third party request with a second bot detection problem involving a moderate amount of computational overhead. For example, the second bot detection problem may take an average machine one second to complete.

When the number of requests by the third party meets or exceeds the second threshold, the process responds (at 260) to the third party request with a third bot detection problem involving a significant amount of computational overhead. For example, the third bot detection problem may take an average machine five second to complete.

In some embodiments, the attack mitigation machine closes the connection established with the third party requestor after responding to the third party request with the message containing either of the first, second, or third bot detection problem. Should the third party requestor reestablish the connection and resubmit the request with the cookie containing the correct solution to whichever bot detection problem is sent as a result of execution of process 200, the process will respond to the resubmitted third party request by providing the requested content or service in return. Otherwise, the attack mitigation machine drops any subsequent requests from the third party without the correct bot detection problem solution or responds to the subsequent requests by again submitting a bot detection problem with the same or increased difficulty. Process 200 can be expanded to include additional tiers that compound the computational overhead of the bot detection problem as the number of requests from a particular third party exceeds more thresholds.

Process 200 successfully thwarts DDoS attacks by making it progressively more difficult for a botnet, or set of bots operating in tandem, to inundate the attack mitigation machine or targeted entity with excessive requests. Specifically, process 200 limits the number of requests that any one bot can send by increasing amounts of the bot's resources that will be consumed in solving the increasingly difficult bot detection problem. With more of its resources tied up in solving the bot detection problem, the bot will be unable to submit additional requests or will do so at a much slower rate. Therefore, even if all bots of a botnet are able to solve the bot detection problem, their ability to submit requests to the attack mitigation machine or targeted entity will be slowed so significantly that the botnet will be unable to overwhelm the machine or targeted entity.

It should be noted that if the bot was to ignore the bot detection problem and simply issue requests to the attack mitigation machine, the attack mitigation machine will not expend resources in responding to those requests with the desired content. Instead, the attack mitigation machine submits the pregenerated or easily generated bot detection problem in response. After some threshold number of requests from a specific third party without a correct solution to the bot detection problem, the attack mitigation machine can simply ignore or block that specific third party and halt even sending the bot detection problem. In other words, when the number of requests by the third party meets or exceeds some threshold, the attack mitigation machine performing process 200 can blacklist the IP address or IP address and user agent combination of the third party requestor. Once the third party requestor is blacklisted, the attack mitigation machine drops or blocks all requests from the third party requestor until the third party requestor is removed from the blacklist. In some embodiments, the attack mitigation machine blacklists third party requestors for exponentially increasing periods of time. For example, should the number of requests by the third party meet or exceed the second threshold, but not a third threshold, the attack mitigation machine can blacklist the third party requestor for a first period of time during which all requests from the third party requestor are dropped or blocked. Should the number of requests by the third party later meet or exceed the third threshold, the attack mitigation machine can blacklist the third party requestor for a second period of time that is longer than the first period of time.

In some embodiments, process 200 is adapted to use other user verification techniques in conjunction with or in place of the bot detection problem when certain thresholds are met. For instance, rather than submit the third bot detection problem when the number of requests by the third party meets or exceeds the second threshold, process 200 can submit a CAPTCHA identification problem to the third party requestor. As such, different verification techniques can be used in conjunction with the bot detection problem and intermixed at different protection levels specified as part of process 200, thereby leveraging different means to verify whether a third party requestor is an actual user or a bot or attacker.

FIG. 3 provides pseudocode for generating the bot detection problem in accordance with some embodiments. A unique bot detection problem is generated for each third party requestor based on a nibble value 310, an expiration value 320, the third party user agent 330, and the third party or requestor's IP address 340.

In some embodiments, the nibble value 310 sets the bot detection problem difficulty. In some embodiments, the nibble value 310 specifies which digits to the bot detection problem solution must be of a specific value. The more digits that have to be of a specific value, the harder it will be for the third party to find a result that produces such a solution. In some embodiments, the nibble value 310 is a four bit value which can be used to specify a bot detection problem solution having up to sixteen digits of the same value. In some embodiments, the solution to the bot detection problem is a sixteen digit value.

The expiration value 320 sets the amount of time in which the bot detection problem solution remains valid. In other words, if a third party requestor solves a bot detection problem, the third party requestor can provide the solution to the solved problem with subsequent requests for the period of time set forth by the expiration value 320. After expiration of the expiration value 320, the third party may be required to solve a new bot detection problem.

The third party user agent 330 identifies the type of device with which the third party submits the request. The user agent 330 as well as the third party IP address 340 ensure that the solution to the bot detection problem comes from the same third party that originally submitted the request. These parameters 330 and 340 are also used in customizing the bot detection problem and the solution on a per third party requestor basis.

Generating the bot detection problem involves computing a hash token 350 from a salt value (i.e., random data), the third party IP address 340, user agent 330, expiration value 320, and nibble value 310. In some embodiments, the hash token 350 is the result of a Secure Hash Algorithm (SHA) hash of the salt value, IP address 340, user agent 330, expiration value 320, and nibble value 310, although other hashing or mathematical algorithms can be used to derive the hash token 350 from the these parameters. In some embodiments, the hash token 350 is combined with the third party IP address 340, expiration value 330, and nibble value 320 as a string 360.

In some embodiments, an encryption token is produced in place of the hash token by encrypting one or more of the salt value, third party IP address 340, user agent 330, expiration value 320, nibble value 310 rather than hashing these parameters. In some such embodiments, the string 360 is produced by combining the encryption token with the third party IP address 340, expiration value 330, and nibble value 320. In some other embodiments, the string 360 is produced by encrypting the hash token 350 or the encryption token with the third party IP address 340, expiration value 330, and nibble value 320.

A response message including a script, URL of the original request, string 360, expiration value 330, and nibble value 320 is then generated (at 370) to send back to the third party requestor. The script specifies the computations that the third party requestor is to perform in order to generate the bot detection problem solution using at least the string 360 and nibble value 320 as parameters of the computations.

FIG. 4 provides pseudocode for an exemplary script from which a third party requestor solves a bot detection problem in accordance with some embodiments. In executing the script, the third party requestor obtains the string, nibble value, and expiration value that were submitted by the attack mitigation machine as part of the bot detection problem. In some embodiments, the third party requestor obtains the string, nibble value, and expiration value by decrypting them from the message passed by the attack mitigation machine. The third party requestor initializes a solution variable 410 and initial random value 420. Next, the third party requestor enters (at 430) a loop to check if the solution variable 410 contains a correct bot detection problem solution according to the nibble value.

When the solution variable 410 does not contain the correct bot detection problem solution, the third party requestor appends the random value 420 to the string submitted as part of the bot detection problem and hashes (at 440) the resulting combined string. The hash result is stored to the solution variable 410. In some embodiments, the third party requestor performs a SHA hash (e.g., SHA-256) of the string appended with the random value 420. It should be noted that the script can specify the use of other hashes or mathematical algorithms in computing the bot detection problem solution. The random value 420 is incremented. The third party requestor then checks (at 460) the hash solution in loop 430 to determine if a correct solution has been found. The hash is repeated with different random values 420 until the correct solution is found. Finding a random value 420 that provides the correct solution by repeatedly computing the hash with different random values 420 is a computationally expensive operation for the third party requestor.

When the solution variable 410 contains the correct bot detection problem solution, the script obtains the last random value 420 that produced the correct solution. The script then sets (at 450) a cookie with the string and the last random value 420 producing the correct solution as the solution information. In some embodiments, setting the cookie involves appending the string with the last random value 420 and entering the combined result as the solution information that is provided with the cookie. In some embodiments, setting the cookie involves encrypting the string and the last random value 420 and entering the encryption result as the solution information that is provided with the cookie. The third party requestor resends the original request with the cookie to the original or redirect URL, wherein the redirect URL can be the original URL or any other URL identified in the attack mitigation machine response to the original request from the third party requestor.

FIG. 5 presents pseudocode performed by the attack mitigation machine to verify the bot detection problem provided by a third party requestor. The attack mitigation machine checks (at 510) that the cookie is set in the request submitted by the third party requestor, wherein inclusion of the cookie suggests that the third party requestor has already solved the bot detection problem and is submitting a bot detection problem solution with the cookie.

If no cookie is set, then no solution information to the bot detection problem is provided. The attack mitigation machine can send a new response message with a new bot detection problem to the third party requestor. If, however, a bot detection problem has already been sent to that third party requestor, the attack mitigation machine can choose to block or drop the request.

If the cookie is set, the machine parses (at 520) the solution information in order to extract the string and random value that should be included therein. The machine then parses the string to extract the hash token, requestor IP address, expiration value, and nibble value sent in the response message to the third party. In some embodiments, the parsing steps may involve decrypting the string and random value from the cookie and/or decrypting the string to extract the hash token, requestor IP address, expiration value, and nibble value. These extracted parameters verify that the third party is providing a solution to the bot detection problem created specifically for that third party. If any of these parameters are missing or are not of the correct values, then the attack mitigation machine determines that the bot detection problem was not correctly solved, the third party is providing a solution to a bot detection problem sent to another, or the third party is trying to spoof a solution to the bot detection problem. In such instances, the machine blocks or drops the third party request. In verifying the cookie parameters, the attack mitigation machine verifies (at 530) that the IP address extracted from the cookie string matches the IP address of the third party requestor sending the request with the cookie. The attack mitigation machine further verifies the hash token. As noted above, the hash token is a hexadecimal encoded SHA-256 hash of the salt value, client IP address (i.e., third party IP address), user-agent, expiration time, and nibble value. To verify the extracted hash token, the attack mitigation machine recomputes (at 540) it using the salt value, IP address of the third party requestor, user agent of the third party requestor, extracted expiration value, and extracted nibble value. If the result of this hash does not equal the hash token extracted from the cookie, then the solution is invalid.

The attack mitigation machine further verifies (at 550) that the expiration value has not expired. If the expiration value has expired and is no longer valid, then the solution to the bot detection problem provided in the cookie is irrelevant and the third party will be required to solve another bot detection problem. Accordingly, the attack mitigation machine generates and passes a new bot detection problem for the third party requestor to solve.

Otherwise, the attack mitigation machine verifies the random value used by the third party requestor produces a correct solution to the bot detection problem. The attack mitigation machine appends (at 560) the random value to the string verified to have the correct parameters (i.e., hash token, requestor IP address, expiration value, and nibble value) and hashes the combination. The hash result is then checked according to the nibble value to ensure that the hash result has the correct digits set to the correct values. For example, if the nibble value has a value of two, then the solution is correct when the hash of the string and random value combination produces a result with the last two digits having a value of zero.

In some embodiments, the protection level provided by the attack mitigation machine is configurable. The configurable protections allow the machine to protect different content or content from different content providers differently.

For instance, there may be high demand for first content and low demand for second content. The attack mitigation machine can be configured to submit the bot detection problem for every request for the first content originating from a new user or client, but submit the bot detection problem to a user or client after receiving multiple requests for the second content from the same user or client in a given time frame.

The attack mitigation machine can also be configured to begin sending the bot detection problem in response to requests for specific content after receiving a threshold number of aggregate requests for the specific content within a time frame (e.g., over 10000 requests received for the specific content) or when the receive rate of aggregate requests for the specific content exceeds a threshold (e.g., 500 requests per second). In this instance, the attack mitigation machine waits until demand for specific content reaches a certain level before providing the DDoS protections.

In some embodiments, the attack mitigation machine begins sending the bot detection problem in response to any incoming request after the total demand on the machine reaches a certain level or exceeds some threshold. The demand level can be based on the average or total number of requests received by the attack mitigation machine in a certain interval. The demand level can be based on other metrics such as the processor usage of the attack mitigation machine.

An advantage of the presented embodiments is that the DDoS mitigation and third party validation can be performed using the same machines along the ordinary request path. This is due to the lightweight and low resource overhead required by the implementations presented herein.

Machines along the ordinary request path can include a load balancer or content server. The load balancer can be a machine that distributes requests amongst a collocated set of servers for proportional or consistent processing. For example, in a content delivery network with multiple points-of-presence (PoP), each PoP can include multiple servers that collectively operate to service all requests coming from users in geographic regions neighboring the PoP. A load balancer receives all requests submitted to the PoP and distributes the requests to designated or optimal servers therein. The load balancer can also perform the DDoS mitigation as part of its regular operations, wherein the DDoS mitigation involves the bot detection problem generation and solution verification. Alternatively, content servers can themselves be configured to perform the DDoS mitigation set forth herein. Content servers are machines that process and respond to third party requests by providing content or services in response to the requests.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a hardware processor including cellular telephones, smartphones, portable digital assistants, tablet devices, laptops, notebooks, desktop computers, and networked computers. Examples of computer-readable media include, but are not limited to, CD-ROMs, flash drives, RAM chips, hard drives, EPROMs, etc.

Figure 6:
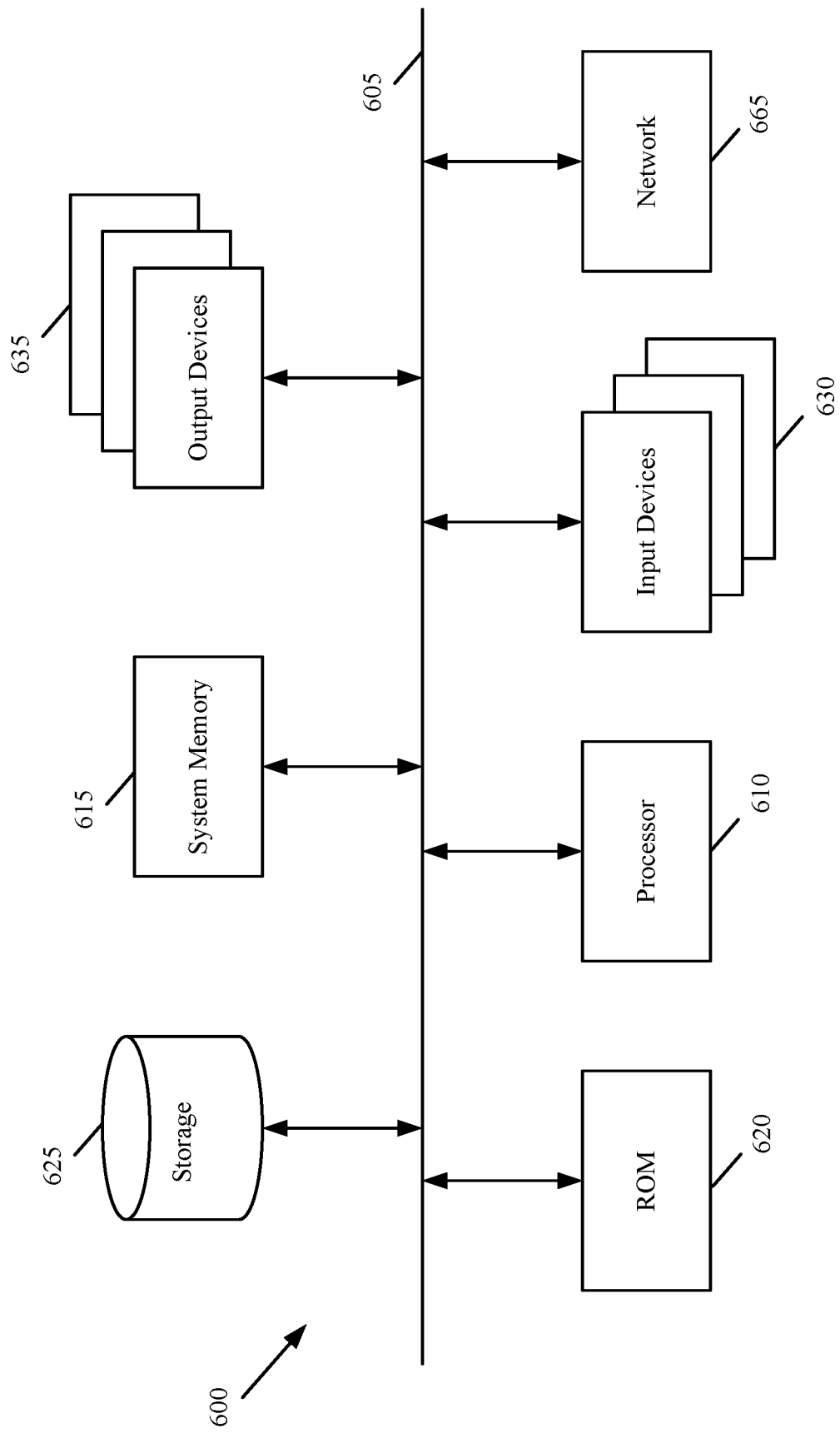
FIG. 6 illustrates a computer system or server with which some embodiments are implemented.

FIG. 6 illustrates a computer system or server with which some embodiments are implemented. Such a computer system includes various types of computer-readable mediums and interfaces for various other types of computer-readable mediums that implement the various methods and machines described above (e.g., attack mitigation machine). Computer system 600 includes a bus 605, a processor 610, a system memory 615, a read-only memory 620, a permanent storage device 625, input devices 630, and output devices 635.

The bus 605 collectively represents all system, peripheral, and chipset buses that communicatively connect the numerous internal devices of the computer system 600. For instance, the bus 605 communicatively connects the processor 610 with the read-only memory 620, the system memory 615, and the permanent storage device 625. From these various memory units, the processor 610 retrieves instructions to execute and data to process in order to execute the processes of the embodiments described above. The processor 610 is a processing device such as a central processing unit, integrated circuit, graphical processing unit, etc.

The read-only-memory (ROM) 620 stores static data and instructions that are needed by the processor 610 and other modules of the computer system. The permanent storage device 625, on the other hand, is a read-and-write memory device. This device is a non-volatile memory unit that stores instructions and data even when the computer system 600 is off. Some embodiments use a mass-storage device (such as a magnetic, solid-state disk, or optical disk and its corresponding disk drive) as the permanent storage device 625.

Other embodiments use a removable storage device (such as a flash drive or solid-state disk) as the permanent storage device. Like the permanent storage device 625, the system memory 615 is a read-and-write memory device. However, unlike storage device 625, the system memory is a volatile read-and-write memory, such as random access memory (RAM). The system memory stores some of the instructions and data that the processor needs at runtime. In some embodiments, the processes are stored in the system memory 615, the permanent storage device 625, and/or the read-only memory 620.

The bus 605 also connects to the input and output devices 630 and 635. The input devices enable the user to communicate information and select commands to the computer system. The input devices 630 include alphanumeric keypads (including physical keyboards and touchscreen keyboards), pointing devices (also called "cursor control devices"). The input devices 630 also include audio input devices (e.g., microphones, MIDI musical instruments, etc.). The output devices 635 display images generated by the computer system. The output devices include printers and display devices, such as liquid crystal displays (LCD).

Finally, as shown in FIG. 6, bus 605 also couples computer 600 to a network 665 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 600 may include one or more of a variety of different computer-readable media. Some examples of such computer-readable media include RAM, ROM, compact discs (CD-ROM), digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for mitigating network-based attacks, the method comprising:

tracking different requests for a plurality of different content;

determining a different request rate for each content of the plurality of content based on said tracking of the different requests;

activating attack protections for first content of the plurality of content in response to the request rate for the first content exceeding a first content attack threshold, wherein said activating attack protections comprises creating computational overhead on a first set of machines of users requesting the first content without imposing said overhead on a second set of machines of users requesting other content from the plurality of content, said computational overhead comprising a sequence of operations for solving a bot detection problem by execution of the first set of machines without user involvement;

restricting access to said first content in response to a new request for the first content comprising no solution or an incorrect solution to the bot detection problem; and sending second content from the plurality of content in response to a new request for the second content and tracking the requests for the second content to be less than a second content attack threshold.

2. The method of claim 1, wherein said restricting comprises blocking the new request for the first content based on the new request for the first content comprising the incorrect solution to the bot detection problem, and sending a message comprising the bot detection problem in response to the new request for the first content omitting the solution to the bot detection problem and the new request for the first content being a first request for the first content from a particular user.

3. The method of claim 2, wherein said restricting further comprises blocking the new request for the first content based on the new request for the first content omitting the solution to the bot detection problem and the new request for the first content being at least a second request for the first content from the particular user.

4. The method of claim 1, wherein said restricting comprises sending a message with the bot detection problem comprising a first sequence of computations having a first degree of computational difficulty in response to the new request for the first content and the requests for the first content exceeding the first content attack threshold by a first amount, and sending a message with the bot detection problem comprising a different second sequence of computations having a second degree of computational difficulty that is greater than the first degree of computational difficulty in response to the new request for the first content and the requests for the first content exceeding the first content attack threshold by a second amount that is greater than the first amount.

5. The method of claim 1 further comprising determining individual user request rates of different users for the plurality of different content.

6. The method of claim 5 further comprising activating attack protections for third content in response to the individual user request rate for the third content from a first user exceeding a third content attack threshold.

7. The method of claim 6 further comprising restricting access to said third content in response to a new request for the third content from the first user comprising no solution or an incorrect solution to the bot detection problem, and sending said third content in response to a new request for the third content from a different second user and the individual user request rate for the third content from the second user being less than the third content attack threshold.

8. The method of claim 1, wherein said determining is based on aggregate request rates from a plurality of users requesting each of the plurality of different content.

9. The method of claim 1 further comprising:
sending the first content in response to the new request for the first content comprising the solution to the bot detection problem.

10. The method of claim 1, wherein the new request for the second content omits solution information to the bot detection problem.

11. The method of claim 1 further comprising activating the attack protections against a specific user machine in response to receiving at least a threshold number of requests from the specific user machine over a user request interval.

12. The method of claim 11 further comprising blocking requests, for any of the plurality of different content, from the specific user machine in response to each of the requests from the specific user machine comprising the incorrect solution to the bot detection problem.

13. The method of claim 12 further comprising sending a message comprising the bot detection problem in response to each request from the specific user machine that is a first request for particular content and that omits the solution to the bot detection problem, and restricting access to each request from the specific user machine that is at least a second request for the particular content from the specific user machine and that provides no solution or the incorrect solution to the bot detection problem.

14. The method of claim 1, wherein said tracking comprises at least one of tracking different rates of requests for the plurality of different content over a specific request interval, or tracking a total number of requests for the plurality of different content over the specific request interval.

15. The method of claim 1, wherein the bot detection problem is a script comprising the sequence of computations that can be solved with a specific scripting engine executing on a machine of a user issuing the new request for the first content.

16. The method of claim 1 further comprising increasing the computational overhead of the bot detection problem in response to an increase in the requests for the first content after said activating the attack protections, wherein said increasing the computational overhead comprises increasing a number of computations performed by a user machine to solve the bot detection problem.

17. The method of claim 1 further comprising deactivating the attack protections in response to receiving less than a threshold number of requests for the first content after said activating the attack protections.

18. The method of claim 17 further comprising sending the first content in response to a second new request for the first content that omits the solution and that arrives after said deactivating.

19. A device comprising:
a non-transitory computer-readable medium storing a set of processor-executable instructions; and
one or more processors configured to execute the set of processor-executable instructions, wherein executing the set of processor-executable instructions causes the one or more processors to:
track different requests for a plurality of different content;
determine a different request rate for each content of the plurality of content based on said tracking of the different requests;
activate attack protections for first content in response the request rate for the first content exceeding a first content attack threshold, wherein said activating attack protections comprises creating computational overhead on a first set of machines requesting the first content without imposing said overhead on a second set of machines requesting other content of the plurality of content, said computational overhead comprising a sequence of operations for solving a bot detection problem by execution of the first set of machines without user involvement;
restrict access to said first content in response to a new request for the first content comprising no solution or an incorrect solution to the bot detection problem; and
send second content from the plurality of content in response to a new request for the second content and tracking the requests for the second content to be less than a second content attack threshold.

20. A non-transitory computer-readable medium, storing a set of processor-executable instructions, which, when executed by one or more processors, cause the one or more processors to:
track different requests for a plurality of different content;
determine a different request rate for each content of the plurality of content based on said tracking of the different requests;
activate attack protections for first content in response the request rate for the first content exceeding a first content attack threshold, wherein said activating attack protections comprises creating computational overhead on a first set of machines requesting the first content without imposing said overhead on a second set of machines requesting other content of the plurality of content, said computational overhead comprising a sequence of operations for solving a bot detection problem by execution of the first set of machines without user involvement;
restrict access to said first content in response to a new request for the first content comprising no solution or an incorrect solution to the bot detection problem; and
send second content from the plurality of content in response to a new request for the second content and said tracking the requests for the second content to be less than a second content attack threshold.

* * * * *